United States Patent [19]

Hunt et al.

[11] 4,213,957
[45] Jul. 22, 1980

[54] CARBON BLACK PRODUCTION

[75] Inventors: Harold R. Hunt; King L. Mills, both of Bartlesville, Okla.

[73] Assignee: Phillips Petroleum Company, Bartlesville, Okla.

[21] Appl. No.: 968,157

[22] Filed: Dec. 11, 1978

Related U.S. Application Data

[62] Division of Ser. No. 783,242, Mar. 31, 1977, Pat. No. 4,148,744.

[51] Int. Cl.$^2$ .......................... C01B 31/02; C09C 1/48
[52] U.S. Cl. ..................................... 423/450; 423/449; 423/275
[58] Field of Search ............... 423/275, 449, 450, 456; 252/18, 33, 182, 309, 353

[56] References Cited

U.S. PATENT DOCUMENTS

| | | | |
|---|---|---|---|
| 3,010,794 | 11/1961 | Friauf et al. | 423/275 X |
| 3,010,795 | 11/1961 | Friauf et al. | 423/275 |
| 3,347,633 | 10/1967 | Johnson | 423/450 |

Primary Examiner—O. R. Vertiz
Assistant Examiner—Gregory A. Heller

[57] ABSTRACT

A solution of an alkali metal inorganic salt in water, oil, and an emulsifier are agitated to form an emulsion. The water is removed from the emulsion which is then filtered. The filtrate is useful as an additive for controlling the structure of carbon black produced in the furnace process.

8 Claims, 1 Drawing Figure

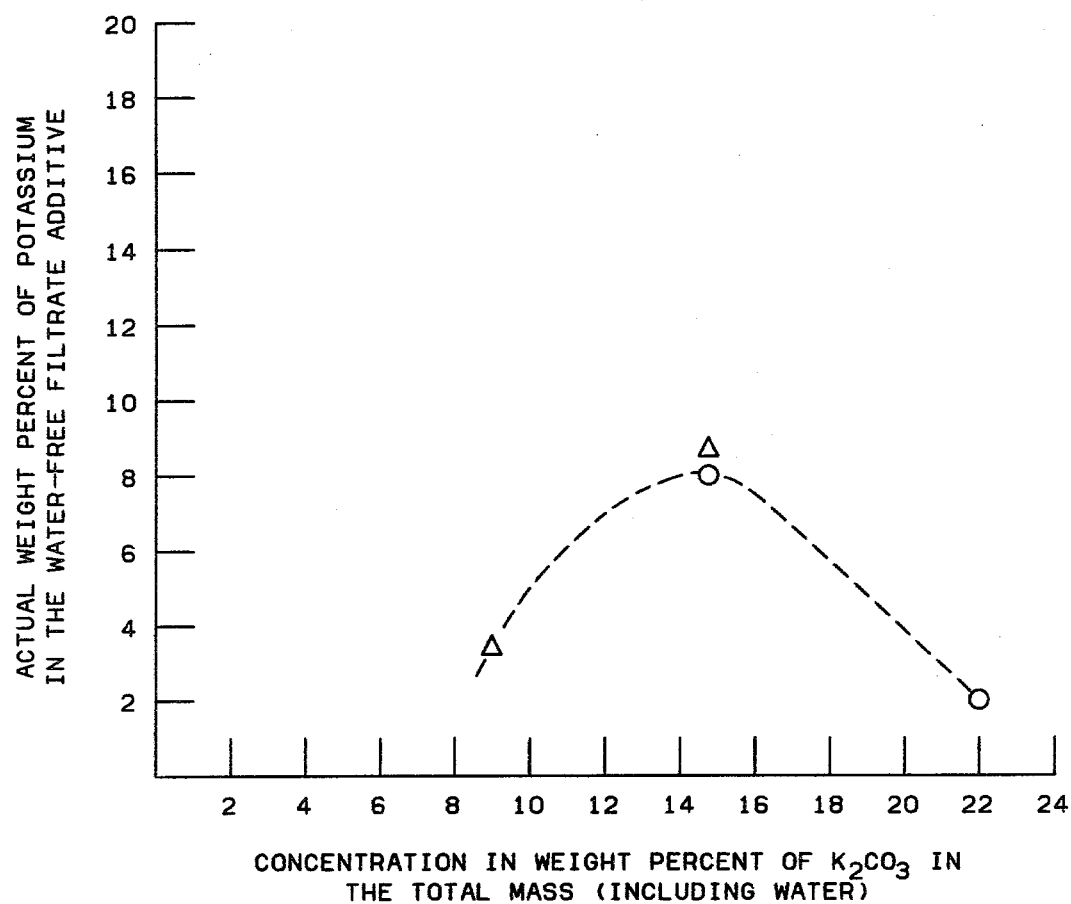

4,213,957

CARBON BLACK PRODUCTION

This application is a division of copending application Ser. No. 783,242, filed Mar. 31, 1977, now U.S. Pat. No. 4,148,744.

BACKGROUND OF THE INVENTION

This invention relates to a process for making carbon black. In particular, it relates to a novel additive used for controlling the structure of carbon black produced by the furnace process.

The carbon black produced by an open flame decomposition of hydrocarbon materials usually has lower structure than that produced by an enclosed-direct-flame-decomposition method. The term "structure" describes the amount of linking of carbon particles to form chains or clusters. The fewer the number of chains or clusters, the lower is the structure of the carbon black. In some applications it is desirable to use carbon black having low structure. Consequently, for those applications carbon black produced by the open flame decomposition method (channel black) is preferred over that produced by the conventional direct flame decomposition method (furnace black). Since the process for producing channel black is much less efficient in terms of utilization of energy and hydrocarbon materials than the furnace process as the cost of both energy and hydrocarbon materials steadily increase, it becomes advantageous to modify the conventional furnace black process so as to produce carbon black having structure comparable with that of channel black.

To reduce the structure of furnace black, alkali metals in free or combined form are added to the hydrocarbon materials. The additive can be uniformly distributed throughout the hydrocarbon materials by suspending it in an aqueous solution or emulsion. A more detailed description of the modified furnace process can be found in U.S. Pat. Nos. 3,010,794, 3,010,795, 3,122,419, 3,347,633, 3,353,980, 3,607,064, and 2,564,700, which are incorporated herein by reference. The problem with this approach is that when the aqueous solution or emulsion is added to the hydrocarbon material the water flashes abruptly carrying with it into the precombustion zone droplets of oil and salts which deposit in the furnace, causing operating difficulties with the make oil nozzle, grit increase in the produced carbon black, etc. Prior systems have avoided this aqueous solution problem by using oil-soluble alkali metal organic compounds. The cost of these organic compounds makes their usage as additive uneconomical.

The present invention solves the problem inherent in the modified furnace process by forming a fine suspension of an alkali metal inorganic salt in oil which is added to the furnace.

Thus, one object of the present invention is to provide an improved process for the production of carbon black.

Another object of the invention is to provide a process for the production of furnace black which has a structure comparable to that of channel black.

A further object of the invention is to provide an improved method for incorporating reaction additives for reducing the structure of carbon black into hydrocarbon material from which carbon black is made.

Still another object of the invention is to provide a reaction additive for reducing the structure of carbon black produced by the furnace process.

A still further object of the invention is to eliminate the nozzle problems and grit formation problems in the furnace caused by flashing of water contained in the additive normally used for controlling the structure of furnace black.

Still another object of the invention is to provide a method for making a reaction additive used in the furnace process, which causes reduction of the structure of carbon black produced by that process.

A still further object of the invention is to use the amount of $K_2CO_3$ in making the emulsion from which a reaction additive is made, which results in a maximum percentage of potassium in the additive.

Other objects of the invention will become apparent to those skilled in the art from a study of this disclosure and the appended claims.

BRIEF DESCRIPTION OF THE FIGURE

The FIGURE shows the correlation between the weight percent of $K_2CO_3$ in the emulsion with the actual weight percent of potassium in the additive suspension in oil (water-free).

SUMMARY OF THE INVENTION

In accordance with one aspect of the invention, a solution of an alkali metal inorganic salt in water, oil, and a suitable emulsifying agent are mixed together to form an emulsion followed by removal of the water from the emulsion by any convenient method and the substantially water-free suspension is passed through a filtering zone. The filtrate, containing a fine dispersion of alkali metal inorganic salt in oil, is added to the hydrocarbon reactant material, from which carbon black is produced, resulting in reduced structure of the produced carbon black.

In accordance with another aspect of the invention, oil and a suitable emulsifier are added to a water solution of an alkali metal inorganic salt and the resulting mixture is agitated thoroughly under such conditions as to form an aqueous emulsion. The aqueous emulsion is added to an oil maintained at a sufficiently high temperature to cause flashing of water therefrom and the essentially water-free suspension is then filtered producing a filtrate, containing a fine dispersion of alkali metal inorganic salt in oil, which is added to the hydrocarbon material from which furnace black is made.

In accordance with a further aspect of the invention, potassium carbonate dissolved in water, a petroleum sulfonate emulsifier, and oil are added to an aqueous solution, and the resulting mixture is agitated so as to form an aqueous emulsion. The aqueous emulsion is stirred while it is gradually heated until essentially all water is evaporated therefrom. The filtrate from the water-free suspension, containing finely dispersed potassium carbonate in oil, is then dispersed throughout the hydrocarbon material and the resulting composition is subjected to include enclosed-direct-flame-decomposition conditions leading to the production of carbon black.

In accordance with a still further aspect of the invention, $K_2CO_3$ constitutes 10–18 weight percent of the original total mass from which the additive is made. This results in the maximum amount of potassium in the water-free additive (filtrate).

DETAILED DESCRIPTION OF THE INVENTION

It has been discovered that furnace black, having structure comparable to channel black, can be efficiently produced by incorporating a novel additive into the hydrocarbon material from which furnace black is made. The additive is made by forming an emulsion from a water solution of an alkali metal inorganic salt, an emulsifier, and oil, and removal of the water from the emulsion leaving a water-free suspension of the salt in oil, which is the novel additive of this invention. The additive is then dispersed throughout the oil used for the production of carbon black by the furnace process.

Any water-soluble alkali metal inorganic salt can be utilized for making the carbon black reaction additive of the present invention. Water-soluble inorganic salts are generally preferred because of the availability and their low costs. Since one weight part of potassium results in the same reduction of structure of carbon black as 20 weight parts of sodium, inorganic water-soluble potassium salts are usually used for making the additive for the present invention. Of all inorganic water-soluble potassium salts that can be used, potassium carbonate is presently believed to be most effective. About 75 weight percent of potassium contained in the potassium carbonate salt was present in the final water-free additive (filtrate) of the invention in the runs described in the Example.

The oil for making an emulsion can be any oil known in the art that is charged to furnace-type carbon black manufacture, such as those "make oils" set out in U.S. Pat. Nos. 2,917,370, and 2,781,247, for examples. In addition to, or as blends with conventionally used make or feed oils, we can use lower boiling range oils, which can be paraffinic, naphthenic, olefinic, and/or aromatic type oils. Preferably, the SUS viscosity at 100° F. (37.8° C.) of the oils used to make the emulsions will be above about 50 seconds, preferably above about 100 seconds, and have an initial boiling point (atmospheric) above about 350° F. (177° C.). Although the oil used in the emulsion can be the same as the hydrocarbon material in which the additive is eventually incorporated, when the hydrocarbon material is a conventional "make oil", it is convenient to use the same "make oil" in the emulsion.

The only criteria for the selection of an emulsifier for making the carbon black reaction additive of this invention is that it should be compatible with the other ingredients and result in forming an emulsion when agitated with a water solution of the alkali metal inorganic salt. Usually, petroleum sulfonate emulsifiers, such as those disclosed in U.S. Pat. No. 3,135,693, are chosen because these are excellent emulsifiers for inorganic salts containing water with relatively viscous oils.

The emulsion can be formed by any conventional method and apparatus. It is generally preferred to use a method and apparatus such as violent stirring, a colloid mill, a gear pump, and the like.

The water can be removed from the emulsion by any conventional method and apparatus. The presently preferred method includes the removal of water by evaporation due to gradual heating of the emulsion, and that of mixing of the emulsion with additional hot oil maintained at a sufficiently high temperature to cause rapid evaporation of water without flashing. The resulting water-free suspension can be filtered by passing it through conventional filtration means such as a leaf-type filter, which will pass solid particles no larger than about 0.04 mm, e.g., U.S. Sieve 325. The major portion of the salt appears to be like a colloidal suspension in the oil.

The water-free filtrate which constitutes the carbon black reaction additive of the present invention is incorporated into the hydrocarbon feed material, such as "make oil", and dispersed therethrough by conventional mixing. The "make oil" is then converted by the furnace process into carbon black that has low structure which is comparable to that of channel black.

The relative amounts, of the components from which the carbon black reaction additive is made, can vary considerably to satisfy the criterion that the mixture be capable of being emulsified. Generally, the weight percent of salt in water can be about 5 weight percent to about a saturated solution of the salt in water. The weight ratio of water (absent the salt) to oil in the emulsion can be about 4:1 to about 1:4, depending upon the oil and upon the emulsifier used. The amount of emulsifier used in the total mass of emulsifier, water, salt, and oil can be from about 5 to about 30 weight percent. Surprisingly, it was discovered that the concentration of the alkali metal in the additive reaches a maximum level as the concentration of the alkali metal inorganic salt in the emulsion is increased and then declines as the concentration of alkali metal inorganic salt in the emulsion is further increased. For $K_2CO_3$, the maximum potassium concentration in the water-free filtrate additive occurs when the concentration of $K_2CO_3$ in the total water-oil-salt-emulsifier containing mass is from about 10 to about 18 weight percent.

The following example is presented to further illustrate the practice of the invention and is not intended to limit the scope of the invention in any manner.

EXAMPLE

A water solution of potassium carbonate was produced. The solution was added to a mixture of Ponca 18 oil:

| "Ponca 18" | |
|---|---|
| BMCI | 125 |
| Avg. Boiling Point, °F. | 808 |
| API @ 60° F. | −0.2 |
| 50% Distilled, °F. | 796 |
| Wt. % Sulfur | 1.5 |
| Wt. % Carbon | 90.5 |
| Wt. % Hydrogen | 7.7 |
| SUS @ 100° F. | 703 | and a petroleum sulfonate emulsifier. The resulting mixture was agitated in a Waring blender to form an emulsion. The emulsion was then added slowly to a mixture of hot Ponca 18 oil and a petroleum sulfonate emulsifier. The liquid mass was agitated and when essentially all water was evaporated, the liquid was passed through paper and celite to produce a carbon black reaction additive. The types and the amounts of compounds used in the two runs, which were made in accordance with the procedure outlined above, are presented in Table I.

Table I

| | Run 1 | Run 2 |
|---|---|---|
| Emulsion (grams) (Ambient temperature) | | |
| $K_2CO_3$ | 61.7 | 100 |
| $H_2O$ | 100 | 100 |

Table I-continued

|  | Run 1 | Run 2 |
|---|---|---|
| Oil | 140 | 140 |
| Emulsifier (U.S. 3,135,693) | 60 | 60 |
| Hot Oil (grams) [300° F. (149° C.)] | | |
| Oil | 38.5 | 38.5 |
| Emulsifier (U.S. 3,135,693) | 16.5 | 16.5 |

In the next two runs, the procedure was identical with that of the first two runs except the emulsion, instead of being added to hot oil, was slowly heated and agitated to a temperature of 300° F. (149° C.). The types and the amounts of compounds used in Runs 3 and 4 appear in Table II.

Table II

|  | Run 3 | Run 4 |
|---|---|---|
| Emulsion (grams) | | |
| $K_2CO_3$ | 30.85 | 61.7 |
| $H_2O$ | 50 | 100 |
| Oil | 178.5 | 178.5 |
| Emulsifier (U.S. 3,135,693) | 76 | 76.5 |

The water-free filtrate in each of the four runs was analyzed for weight percent potassium by conventional flame emission spectroscopy. The results of actual potassium analysis and that amount of potassium which should have been in the filtrate, based on the amount of $K_2CO_3$ used in the runs, are presented in Table III.

Table III

Weight Percentages of K+ from $K_2CO_3$ in the Additive (Water-Free Filtrate):

|  | Run 1 | Run 2 | Run 3 | Run 4 |
|---|---|---|---|---|
| Calculated, wt. % | 11.0 | 15.9 | 6.1 | 11.0 |
| Actual, wt. % | 8.25 | 2.05 | 3.13 | 8.46 |
| Yield* | 75% | 13% | 51% | 77% |
| (Not Passing Filter) | 25% | 87% | 49% | 23% |

*Yield shows amount of potassium present in the filtrate based on total potassium (add as $K_2CO_3$) which should have been present if the resulting suspended $K_2CO_3$ would have passed through filtration in the filtrate.

The correlation between concentration (in weight percent) of $K_2CO_3$ in the total water-containing mass with the concentration of K in the water-free filtrate additive is plotted in the FIGURE, the points plotted being: (9.2, 3.13); (14.8, 8.25); (14.8, 8.46); and (21.98, 2.05), respectively.

We claim:

1. A process for the production of carbon black having reduced structure which comprises:
mixing a water solution of an alkali metal inorganic salt with oil wherein said oil has an SUS viscosity at 100° F. above about 50 seconds and an initial boiling point above about 350° F. and a suitable emulsifying agent at conditions which form an emulsion wherein said emulsifying agent is compatible with the other ingredients and forms an emulsion when agitated with a water solution of the alkali metal inorganic salt;
removing water from the emulsion under conditions to form a substantially water-free suspension;
filtering the substantially water-free suspension to produce a carbon black reaction additive;
dispersing the additive in a hydrocarbon material from which carbon black is to be produced; and
subjecting the hydrocarbon material containing said additive to enclosed-direct-flame-decomposition conditions to produce carbon black.

2. A process according to claim 1 wherein the alkali metal inorganic salt is potassium carbonate and the emulsifier is a petroleum sulfonate.

3. A process according to claim 2 wherein the concentration of potassium carbonate in the total mass prior to removal of water therefrom is from about 10 to about 18 weight percent of the total weight of the mass.

4. A process in accordance with claim 1 wherein said water solution of an alkali metal inorganic salt contains at least 5 weight percent of said salt and said water solution is mixed with a blend of the oil and emulsifying agent to form the emulsion in which blend the amount of emulsifying agent present ranges from about 5 to about 30 weight percent of the total mass.

5. A process for producing carbon black which comprises charging to a carbon black furnace, at carbon black forming conditions, a fluid hydrocarbon oil feed containing a sufficient amount of an alkali metal inorganic salt to control the structure of the carbon black produced, said inorganic salt having been added to said hydrocarbon feed as a fine colloidal-like suspension in an oil which suspension was formed by the steps of:

(a) mixing an aqueous solution of an alkali metal inorganic salt with an oil wherein said oil has a SUS viscosity at 100° F. above about 50 seconds and an initial boiling point above about 350° F. and an emulsifying agent under conditions which produce an emulsion wherein said emulsifying agent is compatible with the other ingredients and forms an emulsion when agitated with a water solution of the alkali metal inorganic salt;

(b) subjecting the emulsion formed in (a) to a temperature ranging from about 250° F. to about 500° F. (121°–260° C.) and a pressure sufficient to substantially remove water therefrom;

(c) filtering the substantially water-free mixture obtained in (b) to obtain a liquid filtrate of oil containing finely divided colloidal particles of an alkali metal inorganic salt suspended in the oil; and (d) recovering the filtrate obtained in (c) for addition to said hydrocarbon feed being passed to said carbon black furnace.

6. A process in accordance with claim 5 wherein the alkali metal inorganic salt is potassium carbonate and the amount of said potassium carbonate in the aqueous solution of step (a) is sufficient to render a potassium carbonate concentration in the total water-oil-alkali metal inorganic salt-emulsifier containing emulsion of step (a) from about 10 to about 18 weight percent.

7. A process according to claim 5 wherein additional hot oil and emulsifying agent are added to the emulsion obtained in (a), but prior to removal of water in (b) to facilitate removal of water from the emulsion.

8. A process according to claim 7 wherein the hot oil and emulsifying agent are added as a mixture and are heated to a temperature of at least about 300° F. (149° C.) prior to being combined with the emulsion obtained in (a).

* * * * *